(12) United States Patent
Breuer et al.

(10) Patent No.: US 10,917,780 B2
(45) Date of Patent: Feb. 9, 2021

(54) WIRELESS TERMINAL FOR OPERATING IN A CELLULAR NETWORK

(71) Applicant: Gemalto M2M GmbH, Munich (DE)

(72) Inventors: Volker Breuer, Boetzow (DE); Osaid Khaliq, Berlin (DE)

(73) Assignee: THALES DIS AIS DEUTSCHLAND GMBH, Munich (DE)

( * ) Notice: Subject to any disclaimer, the term of this patent is extended or adjusted under 35 U.S.C. 154(b) by 0 days.

(21) Appl. No.: 16/331,233

(22) PCT Filed: Sep. 12, 2017

(86) PCT No.: PCT/EP2017/072858
§ 371 (c)(1),
(2) Date: Mar. 7, 2019

(87) PCT Pub. No.: WO2018/050622
PCT Pub. Date: Mar. 22, 2018

(65) Prior Publication Data
US 2019/0191292 A1 Jun. 20, 2019

(30) Foreign Application Priority Data
Sep. 13, 2016 (EP) .................................. 16188524

(51) Int. Cl.
*H04W 8/08* (2009.01)
*H04W 48/12* (2009.01)
(Continued)

(52) U.S. Cl.
CPC ............... *H04W 8/08* (2013.01); *H04W 4/70* (2018.02); *H04W 36/08* (2013.01); *H04W 48/12* (2013.01);
(Continued)

(58) Field of Classification Search
CPC ....... H04W 8/08; H04W 48/16; H04W 36/08; H04W 76/11; H04W 52/0219;
(Continued)

(56) References Cited

U.S. PATENT DOCUMENTS

2005/0090278 A1* 4/2005 Jeong ................ H04W 36/0055
455/525
2011/0044253 A1* 2/2011 Zisimopoulos ....... H04W 48/16
370/328
(Continued)

FOREIGN PATENT DOCUMENTS

JP 2016-106452 A 6/2016
WO 2013011375 A2 1/2013
(Continued)

OTHER PUBLICATIONS

System information area scope and value tag Sony 3GPP TSG RAN WG2 #93, R2-161140 Feb. 2016 (Year: 2016).*
(Continued)

*Primary Examiner* — Rina C Pancholi
(74) *Attorney, Agent, or Firm* — Buchanan Ingersoll & Rooney PC

(57) ABSTRACT

A wireless terminal for operating in a cellular network includes a transceiver, at least one processor and a memory. The transceiver is configured to receive system information respectively transmitted by base stations comprising area system information transmitted by one of the base stations. The area system information is common for a local area covered by said base station and at least one other base station. The processor is configured to store received area system information in the memory. The processor is configured to process a later transmitted area system information only in case of detection of: an area identifier transmitted with the system information indicating a change of area, or a system value change field transmitted with the system (Continued)

information indicating a change of values of area system information values, or an overrun field transmitted with the system information indicating an overrun of the system value change field.

16 Claims, 3 Drawing Sheets

(51) Int. Cl.
| | | |
|---|---|---|
| *H04W 48/20* | (2009.01) | |
| *H04W 4/70* | (2018.01) | |
| *H04W 52/02* | (2009.01) | |
| *H04W 76/11* | (2018.01) | |
| *H04W 36/08* | (2009.01) | |
| *H04W 48/16* | (2009.01) | |

(52) U.S. Cl.
CPC .......... *H04W 48/16* (2013.01); *H04W 48/20* (2013.01); *H04W 52/0219* (2013.01); *H04W 76/11* (2018.02); *G06F 2221/2111* (2013.01); *Y02D 30/70* (2020.08)

(58) Field of Classification Search
CPC ....... H04W 4/70; H04W 48/20; H04W 48/12; H04W 48/14; Y02D 70/12; Y02D 70/00; Y02D 70/21; Y02D 70/20; Y02D 70/126; Y02D 70/10; Y02D 70/24; Y02D 70/1262; G06F 2221/2111
See application file for complete search history.

(56) References Cited

U.S. PATENT DOCUMENTS

| | | | | |
|---|---|---|---|---|
| 2011/0171979 | A1* | 7/2011 | Rune | H04W 24/02 455/458 |
| 2015/0011213 | A1* | 1/2015 | Lou | H04W 48/12 455/436 |
| 2015/0223148 | A1* | 8/2015 | Shi | H04W 48/10 370/312 |
| 2016/0234735 | A1* | 8/2016 | Kubota | H04W 48/14 |
| 2016/0234736 | A1* | 8/2016 | Kubota | H04W 36/0083 |
| 2017/0332372 | A1* | 11/2017 | Lee | H04W 72/0413 |

FOREIGN PATENT DOCUMENTS

| | | |
|---|---|---|
| WO | 2013/068369 A1 | 5/2013 |
| WO | 2015/119865 A1 | 8/2015 |
| WO | 2016/130353 A2 | 8/2016 |
| WO | 2016121308 A1 | 8/2016 |

OTHER PUBLICATIONS

Office Action (Notice of Reasons for Rejection) dated Jan. 14, 2020, by the Japanese Patent Office in corresponding Japanese Patent Application No. 2019-514015 and English translation of the Office Action. (12 pages).

Intel Corporation, "System Information for Standalone NR Deployment", 3GPP TSG-RAN WG2 Meeting #95, R2-165007, Aug. 26, 2016, retrieved from the internet: http://www.3gpp.org/ftp/tsg_ran/WG2_RL2/TSGR2_95/Docs/R2-165007.zip. pp. 1 to 6.

International Search Report (PCT/ISA/210) dated Oct. 13, 2017, by the European Patent Office as the International Searching Authority for International Application No. PCT/EP2017/072858.

Written Opinion (PCT/ISA/237) dated Oct. 13, 2017, by the European Patent Office as the International Searching Authority for International Application No. PCT/EP2017/072858.

"Integer overflow—Wikipedia", Jul. 30, 2014, retrieved from the internet: https://en.Wikipedia.org/w/index.php?title=Integer_overflow&oldid=619119936.

Gemalto N.V., "System Information for NR including ID and version tag", Sep. 28, 2016, retrieved from the internet: http://www.3gpp.org/ftp/TSG_RAN/WG2_RL2/TSGR2_95bis/Docs/R2-166132.zip.

Siemens Networks, On JBM Example Solution:, 3GPP Draft, vol. SA WG4, Dec. 6, 2006, 15 pages.

Sony, "System Information Area Scope and Value Tag", 3GPP Draft, R2-161140—NBIOT SIB, 3rd Generation Partnership Project (3GPP), vol. RAN WG2, Feb. 14, 2016, retrieved from the internet: http://www.3gpp.org/ftp/Meetings_3GPP_SYNC/RAN2./Docs.

Mertes, Thomas, "Seed7 Manual: Errors", Jul. 6, 2014, retrieved from the internet: http://seed7.sourceforge.net/manual/errors.htm.

Office Action (Notice of Preliminary Rejection) dated Feb. 14, 2020, by the Korean Patent Office in corresponding Korean Patent Application No. 10-2019-7007357 and English translation of the Office Action. (13 pages).

Samsung, "Quantitative Analysis of on-demand SI delivery", 3GPP TSG-RAN WG2 Meeting #95, R2-165202, Gothenburg, Sweden, Aug. 22-26, 2016 (Aug. 21, 2016), XP051140935, Retrieved from the Internet on Aug. 21, 2016 URL:http://www.3gpp.org/ftp/Meetings_3GPP_SYNC/RAN2/Docs/. (7 pages).

Office Action (Communication pursuant to Article 94(3) EPC) dated Nov. 16, 2020, by the European Patent Office in corresponding European Patent Application No. 17762151.3. (10 pages).

* cited by examiner

ID

WIRELESS TERMINAL FOR OPERATING IN A CELLULAR NETWORK

FIELD OF THE INVENTION

The present invention relates to a wireless terminal for operating in a cellular network. The invention also pertains to a base station of said cellular network.

The invention further relates to a method for handling such wireless terminal.

The invention additionally relates to a method for handling such base station.

BACKGROUND OF THE INVENTION

In the field of cellular wireless communication the technology standards are further evolving in the direction of a dedicated support for machine-type communication (MTC) devices, that are in particular qualified as low-cost devices. Those devices are able to operate in latest generation cellular networks like LTE or 5G, but do not have in terms of hardware resources the capabilities to fully operate with the respective base station, in particular eNodeBs.

Moreover such MTC devices often operate with limited power sources and are therefore bound to reduce the signaling with the active eNodeBs compared to common mobile handsets.

Some proposals which are supposed to support the envisaged objective comprise that the system information which are broadcasted by a base station in system information blocks (SIBs), are not only concerning the broadcasting eNodeB itself, but comprise parts that are dedicated for a plurality of base station, which cell coverage region forms an area. Such area system information is in particular foreseen to broadcast information that are common for all base station of that area. Therefore a wireless terminal which reads in one cell the SIBs and moves to another cell of the same area does not need to read the area related part as long as no indication is present which informs about a change in the area SIBs.

For that purpose proposals like 3GPP R2-161140 System Information Area Scope and Value Tag (contribution for 3GPP TSG RAN WG2) suggest an identifier, in particular the area identifier (area ID) which gets incremented when at least one field of the area SIBs change.

Disadvantageous of this solution is on the one hand, that by this way different areas might have the same area ID, which would have undesirable effects for a sleeping wireless terminal which gets moved to different cell areas. Further if a wireless terminal is in a sleep-mode, in particular MTC equipment for which long sleeping times are suggested, it could miss a change, when many area SIB changes happen, and thus the area ID might during the sleep phase of the wireless terminal overrun.

Further this leads to the situation that each change of the area ID forces the wireless terminal to completely read the area SIBs. Many changes here would in effect lead to higher efforts for reading and decoding SIBs than without the area SIB definition.

It is therefore the goal of present invention to overcome the mentioned disadvantages and to propose a solution for an improved SIB retrieval for a wireless terminal, in particular a MTC wireless terminal with reduced hardware resources. Further alternative and advantageous solutions would, accordingly, be desirable in the art.

SUMMARY OF THE INVENTION

For this it is according to a first aspect of the invention suggested a wireless terminal according to claim 1. It is further suggested according to a second aspect of the invention a base station according to claim 7. According to a third aspect of the invention it is proposed a method to operate wireless terminal according to claim 10. According to a fourth aspect of the invention it is proposed a method to operate a base station according to claim 13. In a fifth aspect of the invention it is proposed a cellular network according to claim 15.

According to the first aspect of the invention it is therefore proposed a wireless terminal for operating in a cellular network comprising a plurality of base stations, the wireless terminal comprising a transceiver, at least one processor and a memory, the transceiver being configured to receive a set of system information, each of the system information respectively transmitted by the base stations comprising an area system information transmitted by one of the base stations, the area system information is common for a local area covered by said base station and at least one other base station, and the processor being configured to store a received area system information in said memory, wherein the wireless terminal is configured upon carrying out a cell reselection from the first (BS1) to a second base station (BS2):

to send to the second base station a request for dedicated transmission of area system information, said request comprising an indication about stored area system information received from the first base station, and to retrieve and process a transmission comprising the difference between said indicated stored area system information and the actual system information from the second base station, wherein the processor of the wireless terminal is further configured to process a later transmitted area system information only in case of detection of:

an area identifier transmitted with the system information indicating a change of area, or a system value change field transmitted with the system information indicating a change of values of system information values.

Optionally additionally an overrun field is transmitted with the system information indicating an overrun of the system value change field.

The invention relates to a wireless terminal for communication in a cellular network according to one of the known wireless technology standards, like 3G 4G or beyond. The wireless terminal is equipped with the necessary circuitry for communicating over the air interface with the base stations, resp. eNodeBs of the cellular network. This comprises in particular transceiver circuitry, including receiving and transmitting capabilities. According to the circuitry also a separate structural design of transmitting circuitry and receiving circuitry is encompassed by the inventive wireless terminal.

The wireless terminal resp. its transceiver is configured to receive and process transmissions from a base station. Typically the base station broadcasts information to wireless terminals. For receiving broadcasted information it is generally not necessary to camp on the base station or being registered to the cellular network, however for certain broadcasts it is advantageous to camp on the base station.

The broadcast is preferably carried out on special broadcast channels, which are typically common channels. In case of a dedicated transmission resp. on demand provisioning of system information, dedicated channels are preferably selected. Preferably by means of dedicated transmission the system information are provided on demand of the wireless terminal, that means in response to a request from the wireless terminal.

As part of the broadcast channels system information are transmitted in a plurality of system information blocks (SIBs). Each system information block has a defined set of data fields according to the respective standard.

System information provide the wireless terminal at least with information relating to the cellular network, the cell and its surrounding.

Some of the data fields included in the system information are related to an area, which comprises at least two cells populated by base stations. Such area system information is common for all cells of the area, that means in case of a cell reselection of the wireless terminal to another base station of the same area as the previous active base station belongs to, the area system information generally do not need to be read again.

Typical examples of area system information are those that differ in relationship with the type of area where the base station is operating. In particular base stations in a city compared to those in rural areas have immensely different characteristics. As a base station in the city has to cover smaller coverage areas but with a higher number of served wireless terminals they need to be capacity optimized rather than coverage optimized as it is the case for countryside base stations covering large cell areas. So system information relating to common DRX cycle, RACH power, maximum allowed transmission power, minimum reception level, MIMO assignment, and even the supported coverage enhancement level would remarkably differ between city and rural areas, but within their area type remain quite similar.

This concept has the advantage that the wireless terminal, in particular when it is operating stationary or at least quasi-stationary, is operating in a manner improving the power consumption regime.

Nonetheless there is the situation that also the area system information may change. In that case the wireless terminal would be bound to receive and process also the area system information.

The question if the area system information is processed by the wireless terminal is imminent in case of a cell reselection, but also when the wireless terminal remains on the base station it is currently camping on.

According to the invention the wireless terminal is therefore configured to read and process instead of the whole area system information regularly at least the following system information fields, which are preferably situated adjacently in a system information block:
  the area identifier,
  the area related system value change field,
  the overrun field.

Though these three system information fields are related to areas, it is advantageous to provide them as part of the general resp. non-area related system information, in order to regularly process them, while the area system information is only processed under the conditions mentioned before.

The area identifier is an identifier which qualifies the area the current cell is belonging to. Preferably the area identifier is unique within a cellular network. This is in particular advantageous as a wireless terminal could be operated in a sleep mode, where it does not receive system information, and move during that time to another area. Otherwise a wireless terminal could potentially wake up in another area, with different area system information, but the same area identifier, which would lead to unpredictable behavior.

When the wireless terminal detects that the area identifier has changed, then it is bound to read and process the complete area system information. Normally this is happening in case of a cell change, but also a re-assignment of cells to another area could cause an area identifier change, or when the wireless terminal wakes up from sleep mode without awareness of a spatial change. In case that system information is provided on demand by the base station the wireless terminal shall request the area system information. The base station will provide the requested information via dedicated signaling, in a more advanced case the request may include the current area identifier, upon which the base station may only provide the related difference between the two sets including updates.

The system value change field transmitted with the system information indicates any change in the area system information. Alike the system information wide system value change field, this field indicates a change of area system information. But it is not bound to one base station, but when in the area related system information a change is happening the area related system value change field is increased for all base stations of the area. Moreover it is preferable to maintain the same value of system value change field through all base stations of the area.

For appropriately handling this value the wireless terminal preferably stores in its memory the area related system value change field previously received and upon regular processing of the currently received system value change field compares the previously received value with the currently received value. If both values differ, the wireless terminal has to read and process the actual area system information.

For the system value change field a given bit-size is foreseen which determines the maximum value. With the existence of wireless terminals which operate in a sleep mode for a longer time, during that they do not retrieve the system information, it can happen, that the system value change field transmitted with the system information has changed during the sleep period of a wireless terminal that often, that the same system value change field value is provided as it is stored in the wireless terminal before going into sleep mode. The wireless terminal in that situation would consequently not process the area system information although a tremendous number of changed values have occurred.

To avoid such a situation the additional overrun field is preferably introduced. This is set resp. increased, once the system value change field changes from the maximum value to the minimum value. When this field is set, the wireless terminal is aware that there have been changes and the wireless terminal is supposed to process the area system information.

With the invention the wireless terminal is able to take advantage from the area related system information and at the same time minimize power resources for processing the system information. Moreover a safeguard is introduced for allowing such inventive wireless terminals to carry out longer sleeping cycles, which are typical for MTC devices, without missing any change in the area system information.

It is in particular suggested that the wireless terminal is configured to conduct an out of service phase, and the processor is configured to process said area system information further in case of the wireless terminal waking up from out of service phase after a predetermined period of time.

Hence the wireless terminal is allowed to carry out a longer sleep phase as it is known by now. This sleep resp. out of service phase means, that the wireless terminal in particular does not process system information. Even though the safeguards described above already assure to a large extent that after the out of service phase the wireless terminal is operating with up to date area system information, there might still be the chance, that after a longer sleep phase the area related system value change field and the overrun field do not provide reliable indication if the area system information have changed during the out of service phase.

It is therefore proposed with this embodiment, that when a predetermined period of time has expired since last processing of the area system information, that the complete area system information is read and processed again, regardless of the values of area identifier, system value change field or overrun field.

With this measure it is on the one hand assured that always up to date area system information is available, and on the other hand the wireless terminal can save resources for processing area system information as much as possible.

According to the invention the wireless terminal is configured upon carrying out a cell reselection from the first to a second base station:

to send to the second base station a request for dedicated transmission of area system information, said request comprising an indication about stored area system information received from the first base station, and to retrieve and process a transmission comprising the difference between said indicated stored area system information and the actual system information from the second base station.

According to this it is foreseen that the system information, in particular the area system information is not resp. not only provided in a broadcast, but could be provided by dedicated signalling, in particular on demand. This may apply to base stations for coming standards which are operating in that high frequency areas that do not allow a broadcast signalling. When a wireless terminal is carrying out a reselection to such a base station, which is operating in the same area as the previously visited base station, then the inventive idea shall be applicable as well. This is achieved by a request for area system information transmitted by the wireless terminal to the base station, which request comprises an indication relating to area system information retrieved from the previously visited base station.

The base station is then configured to check the indication, in particular the area identifier and the system value change field, and check the differences happened meanwhile. This is possible, as the area system information of all base stations of an area are equal and synchronized.

If the new base station belongs to a different area, there is nevertheless the possibility for the base station to figure out the differences between the area system information of its area and that of the area indicated in the request from the wireless terminal.

After checking the differences, the base station is further configured to send a response message to the wireless terminal comprising the differences between the indicated and the actual system information of the base station.

The wireless terminal will then process the retrieved area system information. Preferably, in particular in a connection, the wireless terminal regularly requests at the base station, if changes to the system information have happened.

Should the base station be able to broadcast system information, it is sufficient for the wireless terminal to investigate area identifier, system value change field and overrun field in order to figure out, if an on demand request for area system information is needed.

This method step is advantageous as it reduces the broadcast amount and provides the relevant area system information when they are needed. In particular when the wireless terminal operates in sleep-mode, it can after waking up immediately request the most accurate area system information. Effectively the wireless terminal would retrieve the system information even quicker than with known mechanisms.

In another preferred embodiment it is proposed that wireless terminal is configured to carry out a cell reselection from the current to a second base station, and the processor is configured to process the complete area system information transmitted by the second base station in case at least one of:

the area identifier transmitted by the second base station is different from the area identifier received with said stored set of system information, the system value change field transmitted by the second base station is different from the system value change field received with said stored set of system information, the overrun field transmitted by the second base station indicating an overrun of the system value change field.

With this embodiment it becomes apparent that area system information help the wireless terminal to save power for system information processing compared to the known procedure of system information handling. The previously known situation is, that after a reselection to another base station the wireless terminal is bound to process the complete set of system information. This is one reason why a reselection has some drawbacks in terms of power consumption for a wireless terminal. This in particular is an issue when the cell reselection is carried out in order to operate on a base station which allows a lower power consumption, e.g. due to a better coverage enhancement level or other power related parameters.

With the definition of area system information for a group of base stations this set of system information is identical. Therefore after cell reselection the wireless terminal first checks if the new, means: the second base station is assigned to the same area as the previously visited, means: the first base station. This step is carried out by checking if the area identifier of the second base station is different from the area identifier of the first base station.

If so, the area system information need to be processed. If not, the area system information of the second base station are generally supposed to be unchanged compared to the area system information of the first base station and need not to be processed. This leads to a tremendous power saving effect for a wireless terminal which changes cells.

Nonetheless it can still happen, that during the cell-reselection procedure the area system information have changed. For that situation it is suggested to further check the area related system value change field transmitted with the system information. The area related system value change field of the second base station should have the same value as the area related system value change field of the first base station, as long as no change has happened in the area system information. If here is a change detected, then the area system information need to be processed again. Actually this is not a drawback in terms of power consumption for the cell reselection: If the second base station belongs to the same area than the first base station, then it makes no difference for the wireless terminal, if a cell reselection have been carried out, as the area related system information would need to be processed on the first base station as well.

This is the case as there has been a change to the area system information which affects all base stations of the area, and consequently all wireless terminals would need to process the area system information, regardless if they carried out a cell reselection or not.

A cell reselection is moreover possible after waking up from a sleep mode resp. out of service phase. If this is the case, there might be the same situation as described above that the system value change field for the area system information indicates no change, although many changes have happened due to an overflow. This is according to this embodiment covered with the overrun field. When it is set, the area system information provided by the second base station need to be completely processed.

With this embodiment the power saving effect of present invention is even enhanced for the case of a wireless terminal carrying out a cell reselection, even after a sleep phase.

According to a preferred embodiment it is suggested that the request for dedicated transmission of area system information is only transmitted in case the wireless terminal encounters at least one of:

a) a change of the area, or b) a change of area system information from general system information.

This preferred embodiment comprises that the on demand provisioning of area system information is happening only when it is needed. That means when one of the two mentioned conditions could be encountered, then a request for system information is useful. In effect this embodiment reduces power consumption of the wireless terminal and reduces congestion of the base station.

The detection of a change of area or area system information in particular is derived from information retrieved through provided general system information. Such general system information might in particular be provided as part of the master information block (MIB), which is the central block of eNodeBs in radio access networks supporting LTE technology standard.

In another preferred embodiment it is proposed that in case the system value change field is indicating a change of values of area system information, the processor is configured to process a later transmitted area system information, the processing comprises:

to determine a number of changes from the system value change field, to compare the processed area system information with the stored area system information, and to stop decoding when the number of differences between processed system information and stored area system information complements the retrieved number of changes.

This embodiment relates to a further advantageous improvement related to the system value change field. According to this embodiment the system value change field does not only indicate that changes in the area system information have occurred, but also to what extent such changes have happened. In other words: when for a certain number of area system information fields a change has happened during a broadcast modification period, then the area related system value change field transmitted with the system information is increased by exactly that number of affected area system information fields.

This means for the wireless terminal, which got an indication through the system value change field, that it is supposed to process the area system information of the currently active base station, that it only has to process the area system information as long as further changes compared to the previously processed—and stored—area system information are not yet processed.

The process step for the wireless terminal is consequently first to identify the number of changes, preferably by a simple subtraction operation of the previously read system value change field and the currently received system value change field. Then during the processing of area system information for each field decoded during processing a comparison with the stored area system information is carried out. As soon as a change is detected, the new value is stored and the number of detected changes is compared with the envisaged number of changes. If all changes have happened, that means when the indicated number of changes equals the number of detected changes, the decoding can stop, and the rest of the area system information is assumed as being unchanged, means not further processed.

Preferably this embodiment is also applicable to the other non-area related system information fields.

It is apparent that by this embodiment even in case of a change of area system information further power saving can be achieved. Should during a sleep mode the value of an area system information field change once, and on a second occasion change back to the previous value, the wireless terminal would not detect this change and would miss two changes indicated by the system value change field, but the impact is low, as the wireless terminal in those occasions would completely process the area system information and is still up to date, but needed more power resources than really needed. As those occasions are rare, this drawback is manageable.

It is further suggested that in case at least one of the area identifier or overrun field indicates a change in area system information, the processor is configured to process a later transmitted area system information by decoding the complete area system information.

With that embodiment unlike the previous embodiment a complete processing of the area system information is suggested for the case of an area identifier change—in particular through a cell reselection—or an overrun of the system value change field.

Therefore it is assured that always accurate area system information is available for the wireless terminal.

According to the second aspect of the invention it is proposed a base station of a cellular network for wireless communication, the base station comprising a transmitting circuit, wherein the transmitting circuit is configured to transmit a set of system information to wireless terminals operating with said base station, wherein the set of system information is divided in area related system information blocks and in non-area system information, the area related system information blocks are reserved for a local area covered by said base station and at least one other base station, the base station being configured to provide area system information upon receiving a request from a wireless terminal (UE), wherein the difference to previously transmitted area system information is provided, considering the area identifier included in said received request and the area identifier assigned to said base station, wherein at least one system information block comprises:

an area identifier unique among all areas of the cellular network and a system value change field for counting each change in the data fields of the at least one area system information block. This second aspect of the invention relates to a base station, which is the counterpart of the wireless terminal according to the first aspect of the invention on the air interface for wireless communication.

The base station comprises transmitting and receiving circuitry for wireless communication with a plurality of wireless terminal. Further it is connected to other cellular network components, preferably over wired landline connections.

With the transmitting and receiving circuitry the coverage area of a cell is reached and signals from wireless terminals located in the cell area are supposed to be decodable by the base station.

The base station according to this invention is assigned to an area of cells, together with at least one other base station of the same cellular network, preferably also the same radio access network of the cellular network.

Through further network components, like a Mobility Management Entity (MME), the base stations of an area are provided with system information which are common for the area. Hence all base stations assigned to one area transmit resp. broadcast on a broadcast channel the same area system information. Preferably the system information are transmitted in system information blocks (SIBs).

The area system information transmitted by the base station according to this aspect of the invention provide one area system information block comprising an area identifier, a system value change field for indicating changes in the area system information and an overrun field for indicating an overrun of the system value change field.

These data fields of the respective area system information block is supposed to be processed by each wireless terminal camping on said base station. With that the wireless terminal is in a position to decide if the rest of the area system information blocks needs to be processed or not, as it is described for the first aspect of the invention. In effect through the behavior of the inventive base station it allows the wireless terminal operating with such base stations to reduce power consumption for operation with the base station. Further the base station allows the wireless terminals to change in a sleep resp. out-of-service mode for certain time, and still after wakeup come quickly in an up-to-date status. This reduces congestion for the base station and further assures that all relevant information—like a MTC device specific access ban for the respective area—are available in time at the serviced wireless terminals.

According to another preferred embodiment it is proposed that the base station is further configured to provide area system information upon receiving a request from a wireless terminal, wherein the difference to previously transmitted area system information is provided, considering the area identifier included in said received request and the area identifier assigned to said base station.

With that embodiment the base station is supposed to offer provision of area system information on demand. It is therefore expected that the wireless terminal sends a request to the base station and receives in response the area system information for the area it is operating in. Preferably the wireless terminal provides an indication about earlier received area system information, e.g. from another base station of the same area. With that the base station is able to figure out what has changed since then. For that preferably the base station receives from the wireless terminal a parameter relating to the system value change field. From that the base station is able to determine the differences to the current area system information and provide those differences in response.

Preferably the request by the wireless terminal requests for area and non-area system information in one joint step.

This embodiment is advantageous as it reduces the amount of signaling for exchanging system information, even after a cell-reselection. Further the wireless terminal may after a sleep period be updated on the current area system information when it is needed.

According to a preferable embodiment the base station is further configured that way that the system value change field is counting each change in the data fields of said area system information block.

To increment the system value change field with each change in the area system information allows the wireless terminals retrieving the area system information to reduce the power consumption for processing the area system information. During a broadcast modification period a plurality of changes on the area system information may occur. If no change has happened, the system value change field remains unchanged, and the camping wireless terminal have no reason to read and process the area system information.

If one change has happened, the system value change field is increased by one, and the wireless terminal has the chance to stop processing after the one change compared to the previous processing of area system information is detected. The same applies basically in case of more than one change, as the system value change field is increased by the number of changes and the wireless terminal can stop reading after the envisaged number of changes is detected.

According to another preferred embodiment the base station is configured to transmit data in a frame structure comprising a master system information block, wherein the master information block comprises data fields indicating which parts of the system information are part of the area system information. This embodiment is in particular relevant for base stations compliant to the LTE technology standard. Here the frame structure provides a master information block (MIB) in the center of the addressed frequency range. This master information block comprises a broadcast channel, where in particular system information are transmitted. In order for a more flexible assignment of system information fields resp. blocks to the range of area system information, it is therefore suggested to provide in the MIB at least one data field which indicates which of the system information are area system information and which are cell based system information. Thus over a cellular network the assignment of area system information may vary, while it is preferable for the base stations of one area, to have the same distinction in that sense.

This embodiment gives more flexibility and also introduces a migration path for wireless terminals who can really make use of the inventive feature. A wireless terminal operating like known before would with permanent processing of the system information—if area related or not—still retrieve the relevant information, but for the price of much higher power consumption for having the same information available at the same time.

According to a third aspect of the invention it is proposed a method for reading system information by a wireless terminal operating in a cellular network comprising a plurality of base stations, the method comprising the steps of:

in response to a request by the wireless terminal receiving from the base station, the wireless terminal is currently camping on, a first set of system information, each of the system information respectively transmitted by the base stations comprising an area system information, the area system information being common for a local area covered by said base station and at least one other base station, wherein the difference to previously transmitted area system information is received, considering the area identifier included in said request and the area identifier assigned to said base station, storing said system information, processing a later transmitted area system information only in case of detection of:

an area identifier transmitted with the system information indicating a change of area, or a system value change field transmitted with the system information indicating a change of values of system information values.

This aspect shares the advantages of the first aspect of the invention.

According to a fourth aspect of the invention it is proposed a method for transmitting system information by a base station, being part of a cellular network, the method comprising the step of transmitting a set of system information to wireless terminals operating with said base station, wherein the set of system information is divided in area related system information blocks and in non-area system information, the area related system information blocks are reserved for a local area covered by said base station and at least one other base station, the base station being configured to provide area system information upon receiving a request from a wireless terminal (UE), wherein the difference to previously transmitted area system information is provided, considering the area identifier included in said received request and the area identifier assigned to said base station, wherein at least one system information block comprises:

an area identifier unique among all areas of the cellular network and a system value change field indicating a change of values of a data field of the at least one area system information block.

This aspect shares the advantages of the second aspect of the invention.

According to a fifth aspect of the invention it is proposed cellular network comprising a plurality of base stations according to the second aspect of the invention and at least one mobility management entity configured to control at least two of the base stations belonging to one area, wherein the mobility management entity is configured to indicate in case of a designated change of area system information to said base stations a designated change time.

Preferably the designated change time depicts the beginning of a broadcast modification period.

According to this aspect of the invention the base stations of the second aspect of the invention are controlled by further network components, preferably the Mobility Management Entity. With that the point in time of area system information changes is initiated. The designated change time is indicated and so the base station follows such an instruction by effecting the change in the area system information blocks. The resulting changes in the system value change field or overrun field may be carried out by the base station, but also centrally controlled by the mobility management entity.

This embodiment simplifies the synchronization between the base stations belonging to the same area. Further it assures that a wireless terminal changing from one base station of the area to another are not trapped on an unexpected gap and in the worst case lose information, in another case have to process all area system information again, and waste resources, although this would not be necessary.

As it is shown this invention advantageously solves the depicted problem and provides a robust way of helping in particular MTC wireless terminals with reduced hardware resource to save power during its normal operation. Besides the providing of SIBs and related information via broadcast the solution is also applicable to operation modes where SIBs or part of the SIBs that are only provided on demand, i.e. SIBs common for an area need not to be received or transmitted unless the area is changed, or the content of said SIBs itself is changed.

BRIEF DESCRIPTION OF THE DRAWINGS

The following description and the annexed drawings set forth in detail certain illustrative aspects and are indicative of but a few of the various ways in which the principles of the embodiments may be employed. Characteristics and advantages of the present invention will appear when reading the following description and annexed drawings of advantageous embodiments given as illustrative but not restrictive examples.

FIG. 1a schematically shows the situation of a wireless terminal UE operating in a location where three base stations BS1, BS2, BS3 belonging to one cellular network CN are shown. It is likely that the cellular network comprises more base stations than the shown ones, but for the purpose of this exemplary embodiment it suffices to throw a glance on what is shown.

Figure 1A:
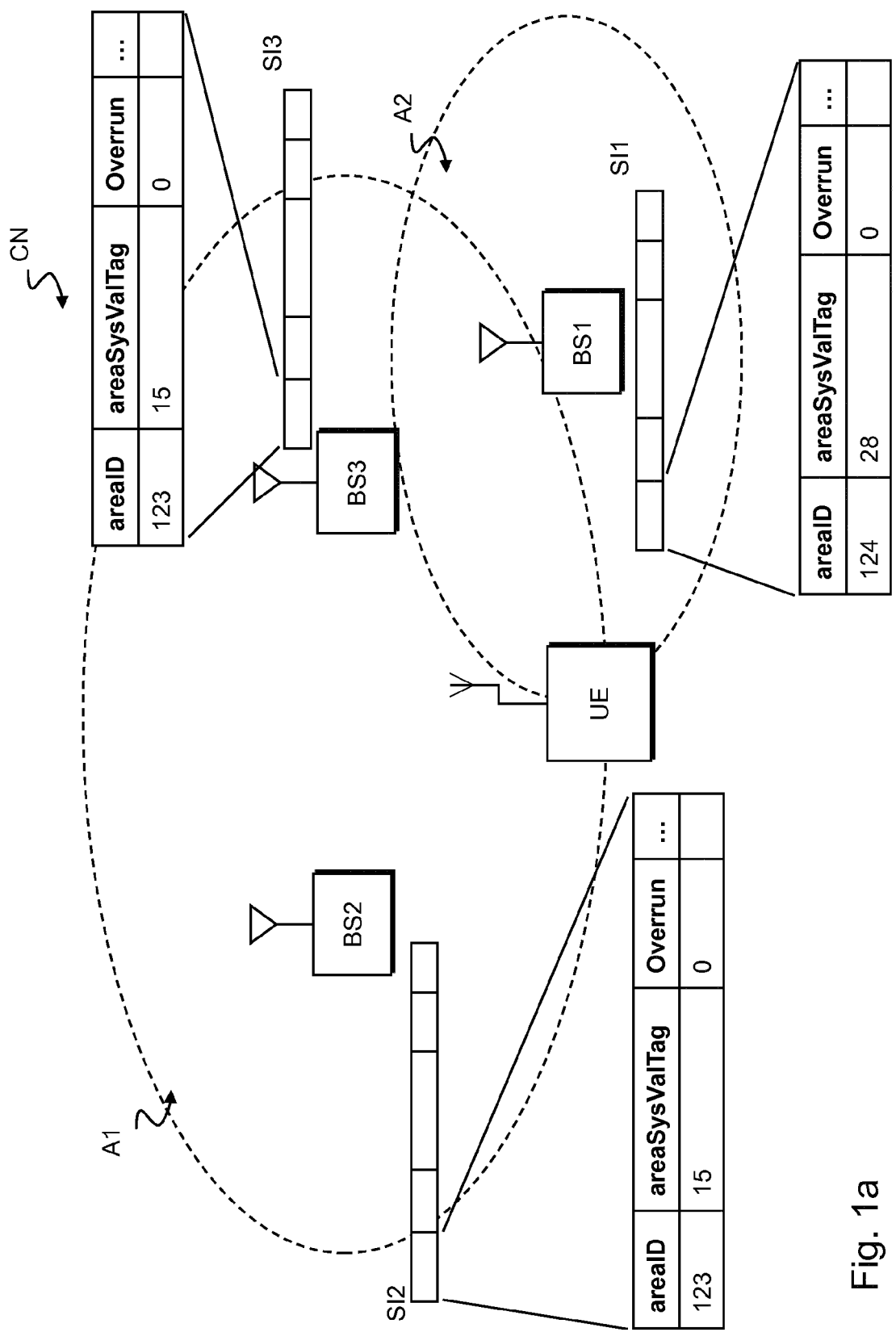
FIG. 1a/b represents a the situation of a wireless terminal which the present invention is applied as an embodiment operating with exemplary base stations of a cellular network, at a first time and a later time.

The base stations BS2 and BS3 are belonging to the same area A1, while base station BS1 belongs to another area A2. Both areas A1, A2 could potentially comprise additional base stations, which are in this example not decodable for the wireless terminal UE.

Typically the areas A1 and A2 differ in the sense that the base stations need to be operating differently, and therefore the area specific system information materially differ. This is in particular the case for base stations operating in cities, which are more capacity optimized, while base stations operating in rural areas are more coverage optimized. More types may lie in between, like residential areas and downtown districts. So in presently exemplifying embodiment the two areas A1, A2 are situated at the borderline between such area types and this is preferably projected to the base station's area composition.

Each of the base station BS1, BS2, BS3 of this embodiment is configured to broadcast system information SI1, SI2, SI3. The system information are distributed on system information blocks, so called SIBs, and among the system information blocks at least one block comprises the area system information. The area system information block—the so-called area SIBs—for base station BS1 is indicated as SI1, for base station BS2 the area SIBs is shown as SI2, and for base station BS3 the area SIBs is shown as SI3. In each case the base stations are supposed to broadcast more SIBs than shown.

As it can be seen in the shown extract of each area SIB SI1, SI2, SI3, each area SIBs starts with the three fields: areaID, areaSysValTag, overrun. Optionally these fields could also be part of the general system information, which need to be read in any case by the wireless terminal. In this exemplary embodiment this is solved differently, which means that the wireless terminal reads and processes the three fields of the area SIBs whenever it processes system information.

The areaID comprises an identifier for the area. With that the base station publishes to the wireless terminals, which process the broadcast, to which area it belongs, and helps the wireless terminal identify if another base station in proximity is part of the same area or not. The addressed wireless terminals either camp on the respective base station, or listen to the broadcast without camping on the base station, in particular in preparation of a cell reselection to or registration on said base station.

The areaID is preferably unique within a cellular network. This is preferable for the situation that a wireless terminal falls in an out of service mode, and is moved in the meantime. When it wakes up in an area which by accident has the same areaID, and also the other values are the same, it will not process the area system information and therefore might operate unpredictably.

The areaSysValTag, which is the system value change field transmitted with the area system information, gives an indication if a change in area system information has happened since the last broadcast modification period has expired. Finally the overrun field indicates if there has been an overrun of the areaSysValTag.

With both values the wireless terminal operating with this base station is able to figure out if it requires to process the area system information again.

Should in the situation shown in FIG. 1a the wireless terminal make a cell reselection from base station BS2 to base station BS3, the wireless terminal would read and process the three fields areaID, areaSysValTag and overrun. With the values in the areaSIBs S2 and S3 the wireless terminal would identify that there is no need to process the whole area SIBs S3 again, as all values stored from previous reading attempt on base station BS2 are still valid.

Differently is the situation with base station BS1. When the wireless terminal makes a cell reselection to this base station, then it will begin to read areaSIB SI1 and will already detect a different areaID—in this case 124 rather than 123 as before on base station BS2. Therefore the wireless terminal knows that for operating with base station BS1 it is necessary to process—preferably the complete—areaSIBs S11.

Preferably a power consumption aware base station might prefer for cell reselection a base station belonging to the same area over a base station of another area, as the acquisition of the system information of the base station of the same area will be less power consuming as for the other base station.

Figure 1B:
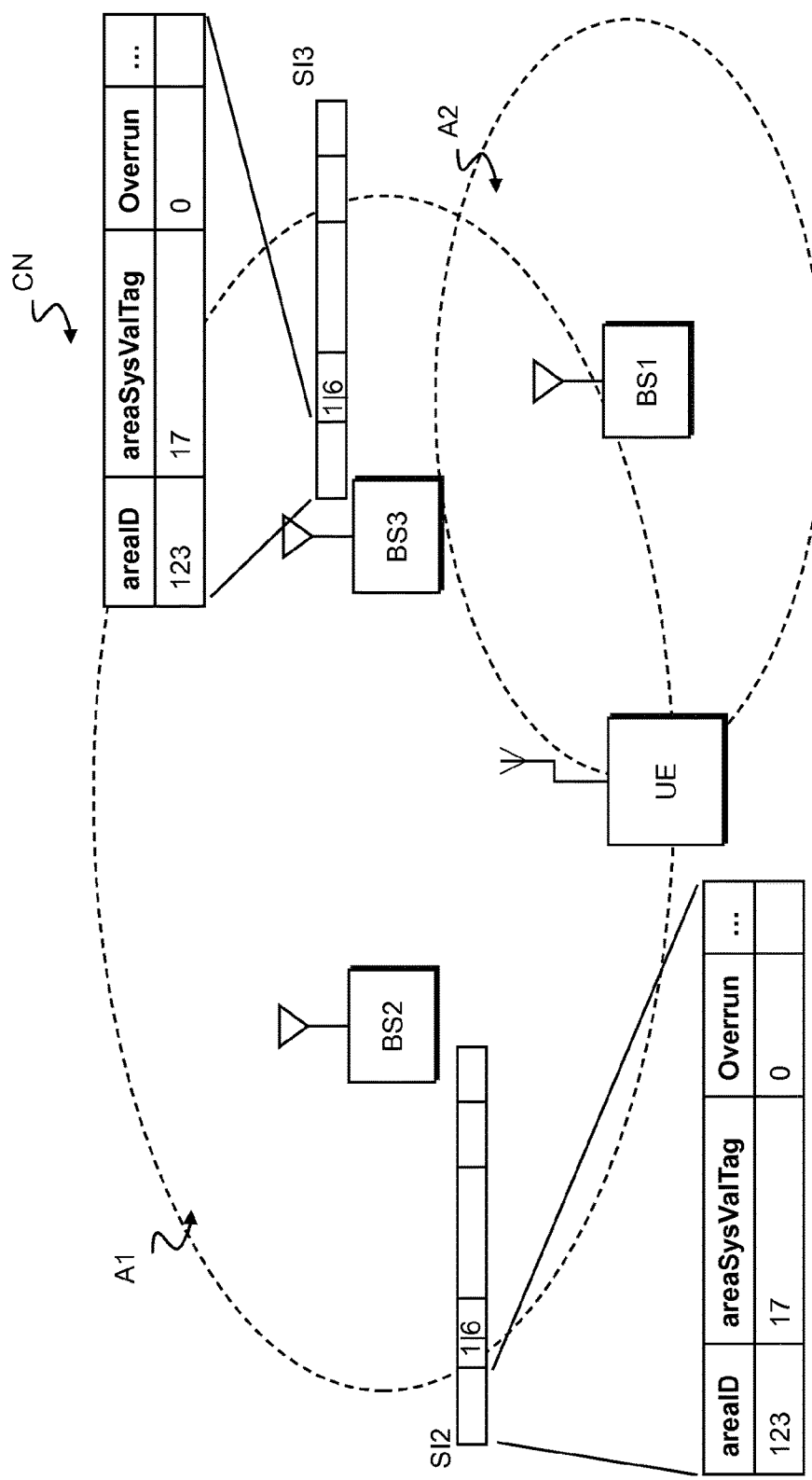

FIG. 1b shows the situation of a change in the area system information for all base stations belonging to the area A1 with areaID 123.

The wireless terminal UE is supposed to receive and process the system information, as they comprise important information for the operation with the cellular network. One important example is the extended access barring (EAB), which is typically indicated by a system information field. With that field selected wireless terminals, in particular MTC terminals, can be barred from accessing or operating on base station.

It would be preferable to have an access barring field as area system information, when it affects a larger region of the cellular network, where certain wireless terminals shall be urged to stop operation with the cellular network. Hence, setting the access barring field as part of the area system information would solve that issue.

In FIG. 1b it is now shown that the areaSysValTag of the base stations of area A1 is increased from 15 (see FIGS. 1a) to 17. The wireless terminals operating on the base station of this area are supposed to regularly process the areaSysValTag, as long as they are not operating in a sleep resp. out-of-service mode. Preferably the time for decoding is determined by the broadcast modification period.

Once the wireless terminal identifies a change in the areaSysValTag it will start to process the area SIBs. In the example shown in FIG. 1b, two values have changed, for an extended access barring here a first bitfield indicates with a "1", that now an extended access barring is activated. With the second field—here a "6"—a class of wireless terminals is depicted, e.g. enhanced coverage devices of a certain coverage level. These changes apply to both base stations BS2 and BS3 of area A1.

Figure 2:
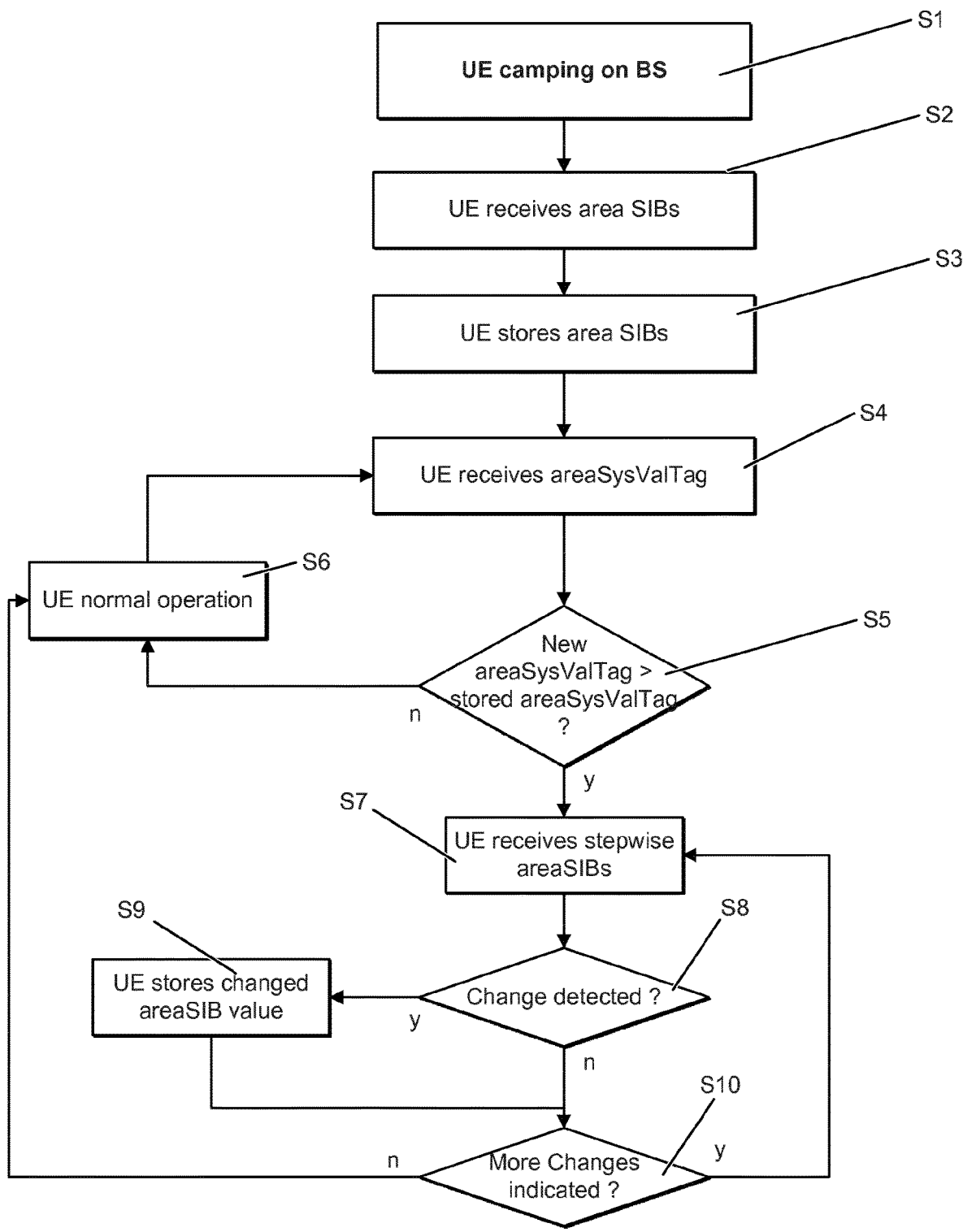
FIG. 2 shows a flow chart of a preferred embodiment of the inventive method.

The wireless terminal after detecting a change in the areaSysValTag consequently is carrying out a procedure as indicated in FIG. 2

Here it starts in step S1 with a wireless terminal UE camping on a base station (BS). Then it receives for the first time a complete set of area SIBs (accompanied by the non-area SIBs) in step S2 and stores them in step S3 in local memory.

Then in step S4 the next cycle is started, preferably after expiration of a broadcast modification period. First the received SIBs comprises at least the areaSysValTag. To be exact also the areaID is detected, and if it differs from the stored areaID, the operation branches to step S2 again.

In step S5 it is checked if the read new areaSysValTag is larger than the stored areaSysValTag. If this is not the case the procedure branches to step S6 and the wireless terminal continues normal operation. That means, here no further power is spent for reading the area SIBs, as no new values are to be expected.

If the new and the stored areaSysValTag differ then the procedure branches to step S7, where the UE stepwise receives and processes the fields of the areaSIBs. Each read field is compared to the stored value of the same field in step S8, and if a change is detected this changed field is stored as shown in step S9. In step S10 it is then to decide if the operation of processing the areaSIB continues.

For the situation of FIG. 1b this means that after a few fields the first bitfield indicating the access barring is detected. After storing this value, it is now checked if more changes are indicated. The indication happened through the increase of the areaSysValTag compared to the previously stored areaSysValTag, and the difference is in this case a value of 2. Preferably in the procedure in step S9 a counter is increased. This counter is in step S10 compared to the difference of new areaSysValTag and previous areaSysValTag. If the counter is lower than the difference, the procedure branches to step S7 for continued processing of the areaSIBs.

In the case of FIG. 1b after detecting the change in the first bitfield, the procedure branches to S7 and reads the next field. Preferably the next field is already the class of wireless terminal affected by the access barring. Hence a change is detected in step S8 and consequently stored in step S9. The further increment of said counter leads to the situation in step S10 that now all changes indicated by the areaSysValTag are already processed. Consequently the procedure branches to S6 and discards the rest of the areaSIBs.

It is apparent that by this preferred embodiment the wireless terminal is able to save a lot of energy for processing the area SIBs by having the possibility to ignore a lot of area SIBs, even though a change of area SIB is indicated.

This is all the more true after a cell reselection among base stations being part of one area, as in the ideal case no additional power needs to be consumed for reading the area related system information.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. Wireless terminal for operating in a cellular network comprising a plurality of base stations, the wireless terminal is configured to camp on, the wireless terminal comprising a transceiver, at least one processor and a memory,
   the transceiver being configured to receive a set of system information, each of the system information respectively transmitted by the plurality of base stations comprising a first area system information transmitted by a first base station of the plurality of base stations, the first area system information being common for a local area covered by said first base station and at least one other base station, and the processor being configured to store the first area system information in said memory,
   wherein the wireless terminal is configured upon carrying out a cell reselection from the first base station to a second base station:
   to send to the second base station a request for dedicated transmission of area system information, said request comprising an indication about the first area system information received from the first base station, wherein said request is sent to the second base station prior to a determination of a difference between the first area system information and a second area system information, and
   to retrieve and process a transmission comprising the difference between said first area system information and the second area system information received from the second base station,
   wherein the processor of the wireless terminal is further configured to process the second area system information only in case of detection of:
   an area identifier, transmitted with the second area system information, indicating a change of area, or
   a system value change field, transmitted with the second area system information, indicating a change of values of area system information values.

2. Wireless terminal according to claim 1, wherein the processor of the wireless terminal is further configured to process the second area system information in case of detection of:
   an overrun field, transmitted with the second area system information, indicating an overrun of the system value change field.

3. Wireless terminal according to claim 1,
   wherein the wireless terminal is configured to carry out the cell reselection from the first base station to the second base station,
   and the processor is configured to process complete area system information transmitted by the second base station in case at least one of:
   the area identifier transmitted by the second base station is different from an area identifier of said first area system information,
   the system value change field transmitted by the second base station is different from a system value change field of said first area system information,
   an overrun field transmitted by the second base station indicating an overrun of the system value change field transmitted by the second base station.

4. Wireless terminal according to claim 3,
   wherein the request for dedicated transmission of area system information is only transmitted in case the wireless terminal encounters at least one of:
   a) a change of the local area, or
   b) a change of the first area system information from general system information.

5. Wireless terminal according to claim 1,
   wherein in case the system value change field is indicating a change of values of area system information, the processor is configured to process the second area system information, the processing comprises:
   to determine a number of changes from the system value change field,
   to compare the second area system information with the first area system information, and
   to stop decoding when a number of differences between the second area system information and the first area system information complements the retrieved number of changes.

6. Wireless terminal according to claim 1,
   wherein in case at least one of the area identifier or overrun field indicates a change in the first area system information, the processor is configured to process the second area system information by decoding complete area system information.

7. Base station of a cellular network for wireless communication, the base station comprising a transmitting circuit, wherein the transmitting circuit is configured to transmit a set of system information to wireless terminals operating with said base station,
   wherein the set of system information is divided in area related system information blocks and in non-area system information, the area related system information blocks are reserved for a local area covered by said base station and at least one other base station,
   the base station being configured to, in response to receiving, from a wireless terminal, a request comprising a first area identifier associated with first area system information, determine differences between the first area system information and a second area system information associated with the base station and provide the differences to the wireless terminal,
   wherein the differences are provided, based on the first area identifier and a second area identifier assigned to said base station, wherein at least one system information block comprises:
an area identifier unique among all areas of the cellular network and
a system value change field indicating a change of values of a data field of the at least one area system information block.

8. Base station according to claim 7,
further configured that at least one system information block comprises:
an overrun field for indicating overrun of system value change field.

9. Base station according to claim 7,
further configured to transmit data in a frame structure comprising a master system information block, wherein the master system information block comprises at least one data field indicating which parts of the set of system information are part of the second area system information.

10. The base station according to claim 7, wherein the base station is one base station of a plurality of base stations of the cellular network, wherein the base station is controlled by at least one mobility management entity configured to control at least two of the plurality of base stations belonging to one area, and
wherein the mobility management entity is configured to indicate in case of a designated change of area system information to said at least two base stations a designated change time.

11. The base station according to claim 10,
wherein the designated change time depicts a beginning of a broadcast modification period.

12. Method for reading system information by a wireless terminal operating in a cellular network comprising a plurality of base stations, the method comprising the steps of:
receiving, by the wireless terminal and from a first base station, the wireless terminal is currently camping on, a first set of system information, each of the system information respectively transmitted by the plurality of base stations comprising a first area system information, the first area system information being common for a local area covered by said first base station and at least one other base station,
sending, by the wireless terminal and to a second base station, a request comprising a first area identifier associated with the first area system information stored by the wireless device,
in response to the request, receiving, by the wireless device and from the second base station, differences between the first area system information and a second area system information associated with the second base station,
wherein the differences between the first area system information and the second area system information are based on the first area identifier included in said request and a second area identifier assigned to said second base station, wherein the request is sent prior to a determination of the differences between the first area system information and the second area system information,
storing said system information,
processing the second area system information only in case of detection of:
an area identifier, transmitted with the second area system information, indicating a change of area, or
a system value change field, transmitted with the second area system information, indicating a change of values of system information values.

13. Method according to claim 12,
comprising the step of carrying out a cell reselection from the first base station to the second base station, and decoding complete area system information transmitted by the second base station in case at least one of:
an area identifier transmitted by the second base station is different from the area identifier received with said first area system information,
a system value change field transmitted by the second base station is different from the system value change field received with said first area system information,
an overrun field transmitted by the second base station indicating an overrun of the system value change field transmitted by the second base station.

14. Method according to claim 12,
wherein in case the system value change field is indicating a change of values of area system information, the method comprises processing the second area system information by means of:
determining a number of changes from the system value change field,
comparing the second area system information with the first area system information, and
stopping decoding when a number of differences between the second area system information and the first area system information complements the retrieved number of changes.

15. Method for transmitting system information by a base station, being part of a cellular network, the method comprising:
transmitting a set of system information to wireless terminals operating with said base station, wherein the set of system information is divided in area related system information blocks and in non-area system information, the area related system information blocks are reserved for a local area covered by said base station and at least one other base station,
receiving, by the base station and from a wireless terminal, a request comprising an area identifier associated with a first area system information stored at the wireless terminal,
in response to receiving the request from the wireless terminal, determining differences between the first area system information and a second area system information assigned to the base station and providing the differences to the wireless terminal,
wherein the differences are provided, based on the first area identifier included in said received request and a second area identifier assigned to said base station,
wherein at least one system information block comprises:
an area identifier unique among all areas of the cellular network, and
a system value change field indicating a change of values of a data field of the at least one area system information block.

16. Method according to claim 15,
wherein the system value change field is counting each change in the data field of said at least one area system information block.

* * * * *